(12) United States Patent
Mouri

(10) Patent No.: US 7,761,003 B2
(45) Date of Patent: Jul. 20, 2010

(54) OPTICAL APPARATUS AND MANUFACTURING METHOD OF OPTICAL APPARATUS

(75) Inventor: Motohisa Mouri, Kawasaki (JP)

(73) Assignee: Nikon Corporation, Tokyo (JP)

( * ) Notice: Subject to any disclaimer, the term of this patent is extended or adjusted under 35 U.S.C. 154(b) by 189 days.

(21) Appl. No.: 12/126,888

(22) Filed: May 25, 2008

(65) Prior Publication Data

US 2008/0292302 A1    Nov. 27, 2008

(30) Foreign Application Priority Data

May 24, 2007   (JP) ............................... 2007-137497
Apr. 15, 2008   (JP) ............................... 2008-106072

(51) Int. Cl.
 G03B 7/099    (2006.01)
 G03B 13/06   (2006.01)

(52) U.S. Cl. ...................................... 396/271; 396/382

(58) Field of Classification Search ................. 396/271, 396/274, 382, 384, 385; 348/341
See application file for complete search history.

(56) References Cited

U.S. PATENT DOCUMENTS 4,019,191 A * 4/1977 Miyata ....................... 396/271
4,309,093 A * 1/1982 Kuwayama et al. ......... 396/271
5,363,163 A * 11/1994 Hayashi et al. ............. 396/379
5,390,084 A    2/1995 Ohtake et al.
5,434,640 A * 7/1995 Takagi et al. ................ 396/234
5,970,263 A * 10/1999 Hirai .......................... 396/271
7,630,627 B2 * 12/2009 Matsuda ..................... 396/384

FOREIGN PATENT DOCUMENTS

| JP | 54-092232 A | 7/1979 |
| JP | 55-36767 A | 3/1980 |
| JP | 60-120334 A | 6/1985 |
| JP | 61-278828 A | 12/1986 |
| JP | 1-36088 B2 | 7/1989 |
| JP | 05-216098 A | 8/1993 |

* cited by examiner

Primary Examiner—Rodney E Fuller
(74) Attorney, Agent, or Firm—Miles & Stockbridge P.C.

(57) ABSTRACT

A single lens reflex camera has a finder optical system that observes an image formed on a reticle by an objective lens, and a photometric device that measures light transmitted through the reticle via at least a part of the finder optical system, at a position shifted from an optical axis of the finder optical system. The finder optical system comprises a Fresnel lens surface which transmits light from the objective lens, and the Fresnel lens surface is positioned so that the center of the Fresnel lens surface is shifted in a direction to cross the optical axis of the finder optical system according to a position of the photometric device.

16 Claims, 6 Drawing Sheets

OPTICAL APPARATUS AND MANUFACTURING METHOD OF OPTICAL APPARATUS

INCORPORATION BY REFERENCE

This invention claims the benefit of Japanese Patent Application No. 2007-137497 and 2008-106072 which is hereby incorporated by reference.

FIELD OF THE INVENTION

The present invention relates to an optical apparatus, such as a single lens reflex camera, and more particularly to a finder optical system where a Fresnel lens and a photometric device are installed.

BACKGROUND OF THE INVENTION

Conventionally, in a finder of a single lens reflex camera, a focal plane on which a real image is formed is observed, and the real image formed by an objective lens is diffused using the focal plane as a diffusing surface, and diffused light which enters into a photometric device positioned near an ocular is measured.

FIG. 8 shows a configuration example thereof, where when a field of view is observed, an image of an object is formed on a focal plane 53 on a reticle by an objective lens 51, and this image is observed by an eye point EP (human eyes) via a penta prism and an ocular, which are not illustrated. In such a finder, a Fresnel lens 54 plays a role of condensing light transmitted through an exit pupil 52 of the object lens 51. A photometric device 55 is positioned near the ocular so that an optical axis thereof is inclined from an optical axis of the finder (ocular), and photometry is performed by condensing a part of the rays which are condensed at the eye point EP, to the photometric device 55.

As a camera having this type of configuration, a camera of which diffusion characteristic of the focal plane is designed to be asymmetric, so as to secure sufficient light for the photometric device is known (e.g. see Japanese Patent Publication No. H1-36088).

PROBLEMS TO BE SOLVED BY THE INVENTION

When a photometric device is positioned in a finder, the photometric device is normally disposed in a position that is shifted from the optical axis of the finer, as mentioned above, and photometry is performed. However, if the optical axis of the photometric device is inclined from the optical axis of the finder, it is difficult to acquire light from the focal plane uniformly on the photometric device, and it is also difficult to acquire light from the entire face of the focal plane (that is all the lights in the photographing range).

SUMMARY OF THE INVENTION

With the foregoing in view, it is an object of the present invention to provide an optical apparatus which can perform photometry over a wider range, and a manufacturing method thereof.

Means to Solve the Problems

To achieve this object, an optical apparatus according to the present invention comprises: a finder optical system that observes an image formed on a reticle by an imaging lens; and a photometric device that measures light transmitted through the reticle via at least a part of the finder optical system at a position shifted from an optical axis of the finer optical system, wherein the finder optical system comprises a Fresnel lens which transmits light from the imaging lens, and the Fresnel lens is positioned so that the center of the Fresnel lens is shifted in a direction to cross the optical axis of the finder optical system according to a position of the photometric device.

A manufacturing method of an optical apparatus according to the present invention, comprises the steps of: providing a finder optical system that observes an image formed on a reticle by an imaging lens, and a photometric device that measures light transmitted through the reticle via at least a part of the finder optical system, at a position shifted from an optical axis of the finder optical system; providing a Fresnel lens which transmits light from the imaging lens in the finder optical system; and positioning the Fresnel lens so that the center of the Fresnel lens is shifted in a direction to cross the optical axis of the finder optical system according to a position of the photometric device.

In the above invention, it is preferable that the center of the Fresnel lens is shifted in a direction to form a right angle or substantially a right angle, with the optical axis of the finder optical system.

Also in the above invention, it is preferable that the center of the Fresnel lens is shifted to a side where the photometric device is positioned.

Also the center of the Fresnel lens may be shifted to a position where incident light to the photometric device is substantially uniform on the photometric device.

If the photometric device has a photometric surface that performs photometry, the center of the Fresnel lens may be shifted to a position where incident light to the photometric surface is substantially uniform on the photometric surface.

Also in the present invention, it is preferable that a shift amount of the center of the Fresnel lens from the optical axis of the finder optical system is 10 to 20% of the dimensions of the field of view range of the finder optical system.

Also in the present invention, it is preferable that the finder optical system comprises an ocular, and where a shift amount of the center of the Fresnel lens from the optical axis of the finder optical system is X and the focal length of the ocular is fe, a condition of the expression $$0 < X/fe < 0.2$$

is satisfied.

Also in the present invention, it is preferable that the optical apparatus is a camera.

Advantageous Effects of the Invention

According to the present invention, photometry can be performed for a wider range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 a diagram depicting a general configuration of a single lens reflex camera.

DESCRIPTION OF THE PREFERRED EMBODIMENTS

Figure 1:
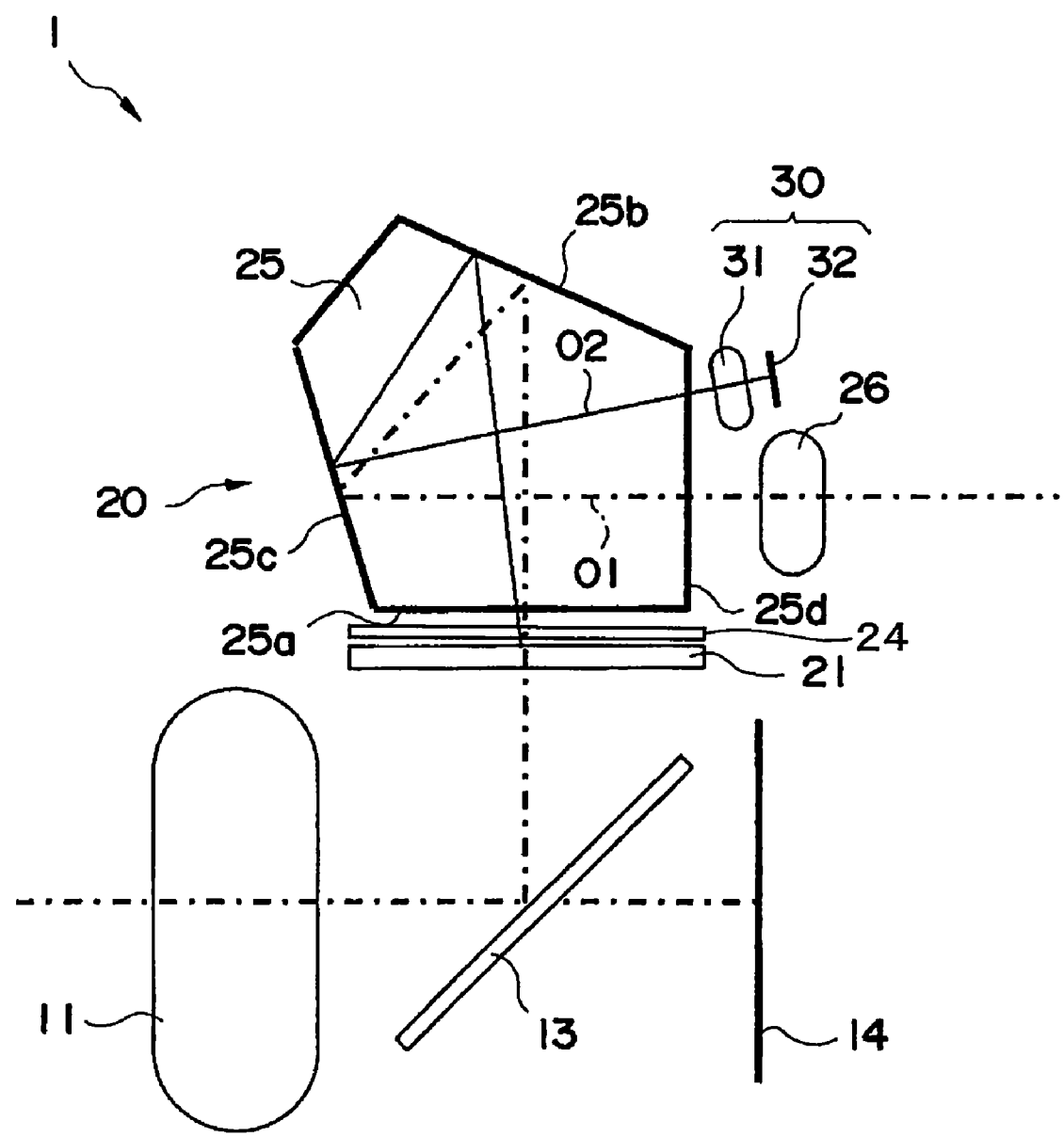

Preferred embodiments of the present invention will now be described with reference to the drawings. FIG. 1 shows a single lens reflex camera 1, which is an optical apparatus of the present invention. This single lens reflex camera 1 comprises an objective lens 11, a quick return mirror 13, an image sensing element 14 that photographs and a finder optical system 20. The finder optical system 20 further comprises a reticle 21, a penta prism 25 and an ocular 26 which are disposed in this order from an object, and an image formed on the reticle 21 by the objective lens 11 can be observed by the ocular 26.

The objective lens 11 forms an object image on the image sensing element 14 or the reticle 21. The quick return mirror 13 is inserted at a 45° angle with respect to the optical axis, which passes through the objective lens 11, and normally (in standby status before photographing), the quick return mirror 13 reflects light from an object (not illustrated) which passed through the objective lens 11 so as to form an image on the reticle 21, and at shutter release time, the quick return mirror 13 enters mirror up status, so that the light from the object (not illustrated) which passed through the objective lens 11 forms an image on the image sensing element 14. In other words, the image sensing element 14 and the reticle 21 are disposed at optically conjugate positions.

Figure 4:
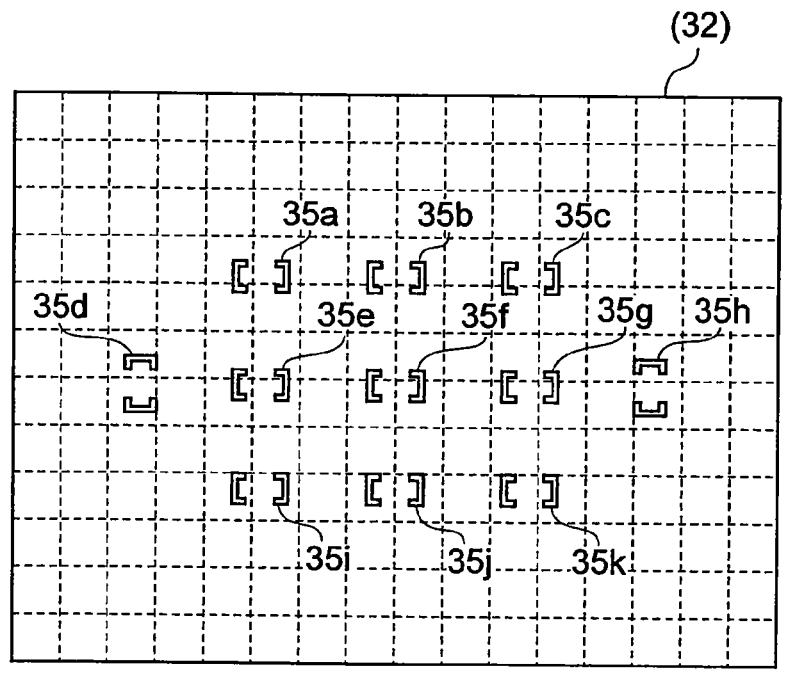
FIG. 4 is a diagram depicting a display example of a focal point detection area marks.

A liquid crystal display element 24 is disposed between the reticle 21 and the penta prism 25. This liquid crystal display element 24 displays such information as focal point detection area marks superimposed on the object image formed on the reticle 21, and also displays various photographing information, including an exposure value, outside the object image. The liquid crystal display element 24 displays 11 focal point detection area marks 35a to 35k disposed vertically and horizontally, as shown in FIG. 4.

The penta prism 25 reverses the object image vertically and horizontally to be an erect image by allowing luminous flux, from the object image (inverted image) which is formed on the reticle 21 by the objective lens 11, to pass through an entrance surface 25a, first reflection surface 25b, final reflection surface 25c and exit surface 25d sequentially. As a result, the penta prism 25 allows an observer to observe the object image as an erect image, and makes the configuration of the finder optical system 20 compact.

Figure 2:
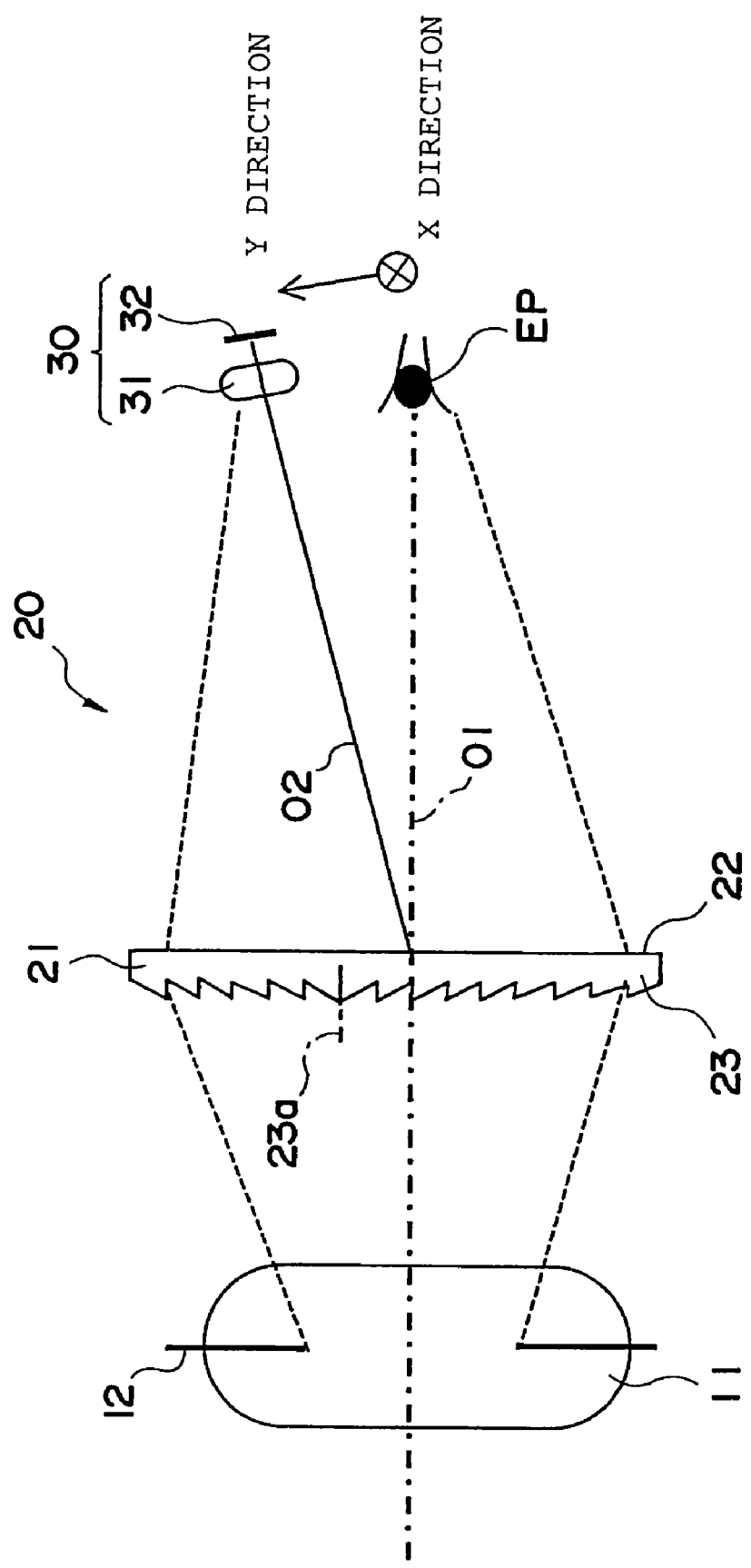
FIG. 2 is a diagram (optical cross-sectional view) depicting a finder optical system.

FIG. 2 shows a simplified configuration of the finder optical system 20. In FIG. 2, illustration of the liquid crystal display element 24, penta prism 25 and ocular 26 are omitted. As described above, the finder optical system 20 is designed such that the image formed on the focal plane 22 of the reticle 21 by the objective lens 11 can be observed by the eye point EP (human eyes) via the penta prism 25 and ocular 26.

A photometric device 30, that measures light transmitted through the reticle 21 via at least a part of the finder optical system 20, is installed near the ocular 26, which is shifted from the optical axis 01 of the finder optical system 20. The photometric device 30 has a photometric lens 31 and a photometric sensor 32, and is constructed such that the optical axis O2 thereof is inclined from the optical axis O1 of the finder optical system 20, and performs photometry by condensing a part of the light, which is transmitted through the reticle 21 and condensed to the eye point EP, to the photometric sensor 32 via the photometric lens 31.

The photometric sensor 32 is an image sensing element, such as CCD and CMOS, having a photometric surface 32a (see FIG. 5), which can perform photometry, and obtains image signals of an object image, formed by luminous flux transmitted through the penta prism 25. The photometric sensor 32 is electrically connected with a control device (not illustrated in FIG. 1 and FIG. 2), which controls activation of the single lens reflex camera 1, and outputs the image signals of the obtained object image to this control device. The photometric sensor 32 may output the image signals of the object image periodically, or may interlock this output with another operation.

Figure 5:
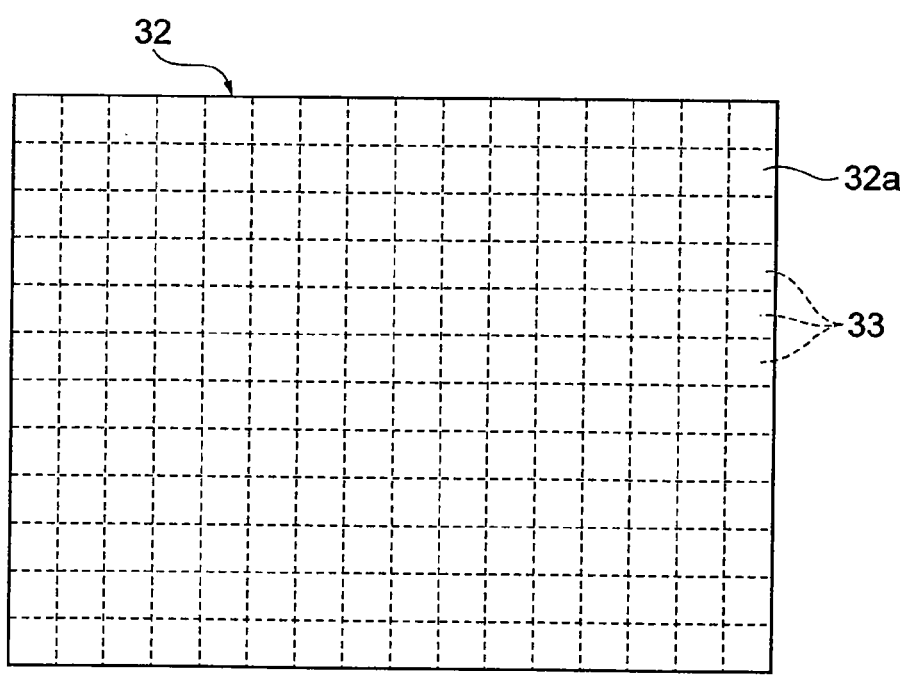
FIG. 5 is a front view of a photometric sensor.
Figure 6:
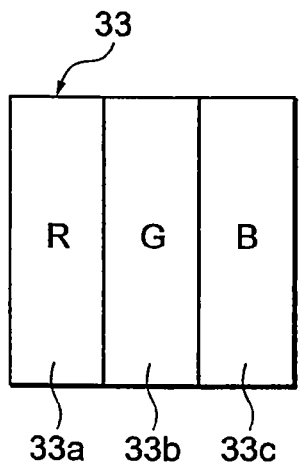
FIG. 6 is a diagram depicting a pixel configuration of a photometric sensor.

FIG. 5 shows a front view depicting a detailed configuration of the photometric sensor 32. The photometric sensor 32, which is an image sensing element, has a plurality of pixels (photoelectric transfer elements) 33 (16 elements W×12 elements L=192 elements in this case), which are arranged in a matrix. Each pixel 33 is separated into three portions, 33a, 33b and 33c, as shown in FIG. 6, and primary color filters, red (R), green (G) and blue (B), are disposed in these portions 33a, 33b and 33c respectively. Hence RGB signals of an object image can be output from each pixel 33.

Figure 7:
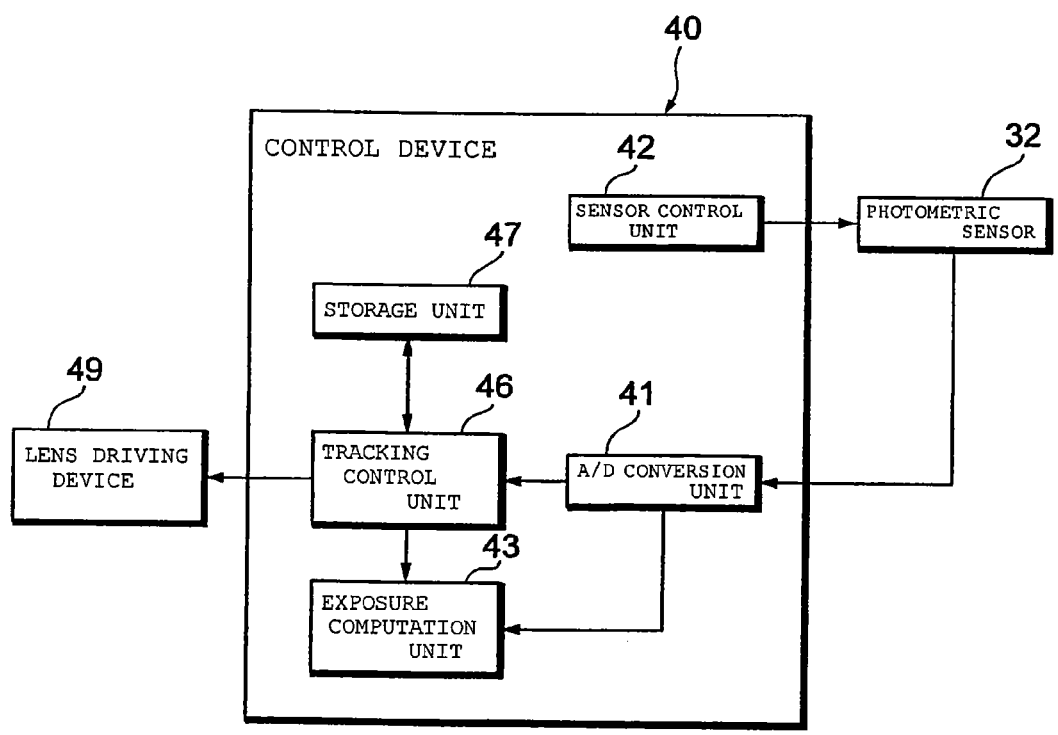
FIG. 7 is a block diagram depicting a configuration of a control device.
Figure 8:
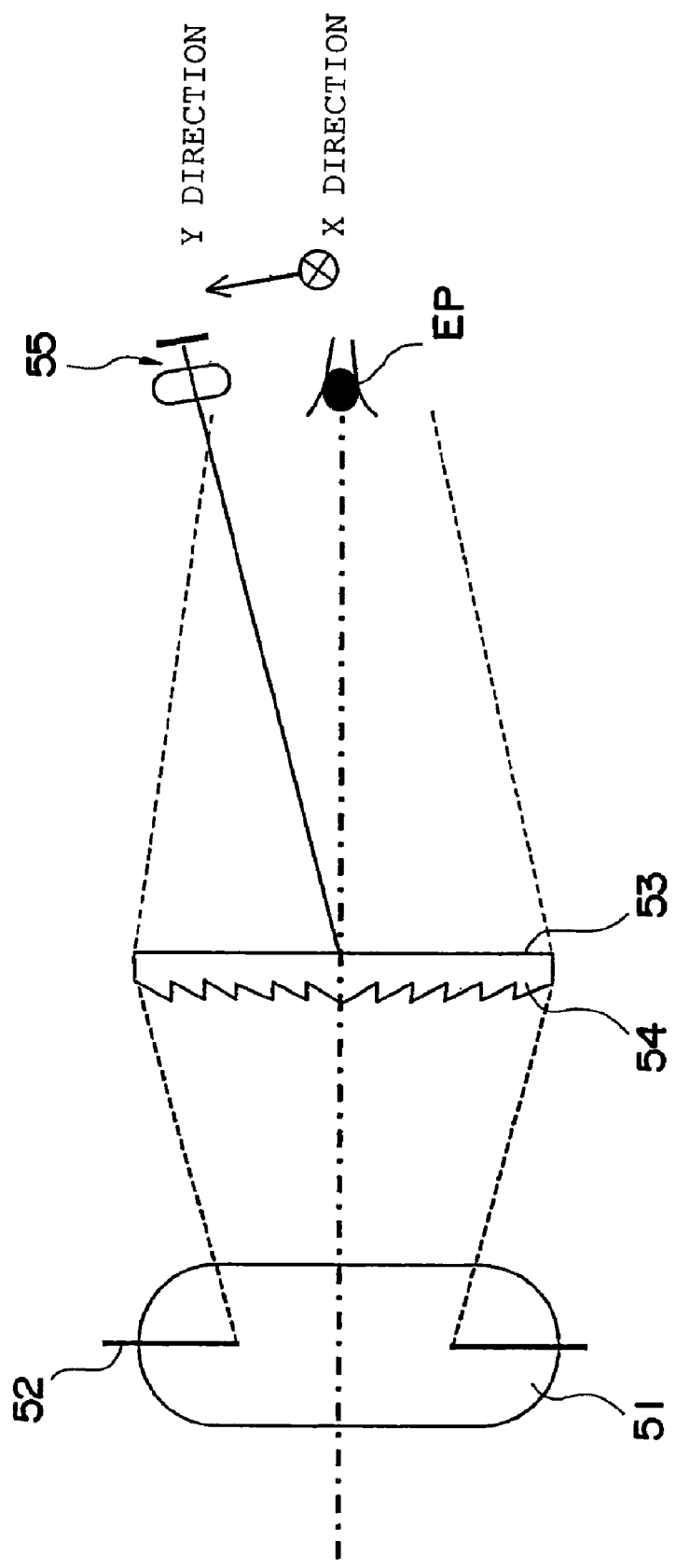
FIG. 8 is a diagram (optical cross-sectional view) depicting a conventional finder optical system.

FIG. 7 shows a detailed configuration of the control device. The control device 40 shown in FIG. 7 is a CPU, for example, and comprises an A/D conversion unit 41, sensor control unit 42, exposure computation unit 43 and tracking control unit 46. The A/D conversion unit 41 converts an analog image signal, which is output from the photometric sensor 32, into a digital image signal as image information. The sensor control unit 42 controls activation of the photometric sensor 32, so that the digital image signal becomes an appropriate value. Specifically, the sensor control unit 42 performs peak AGC control, which sets the storage time and amplifier gain so that the maximum output of the photometric sensor 32 becomes the target output level, or performs average AGC control, which controls the average level of the output from the photometric sensor 32, and becomes the target output level. The exposure computation unit 43 computes an exposure value based on the image signal obtained by the photometric sensor 32.

The tracking control unit 46 stores an image (signal) corresponding to a tracking target (in an object image), which is manually or automatically set with superimposing one of the focal point detection area marks 35a to 35k in the storage unit 47 as a template image, out of the object images (image signals) obtained by the photometric sensor 32, and calculates a lens driving amount that tracks and focuses on the tracking target which is set. The lens driving amount calculated by the tracking control unit 46 is output to a lens driving device 49 installed in the objective lens 11. The lens driving device 49 has a motor and driving circuit, which are not illustrated, and drives a focusing lens (not illustrated) of the objective lens 11 based on the lens driving amount which is input from the tracking control unit 46, and adjusts the focal point.

As shown in FIG. 2, a focal plane 22, on which an object image is formed by the objective lens 11, is formed on a surface of the reticle 21 facing the penta prism 25 (surface at the eye point EP side). A Fresnel lens surface 23 that condenses light transmitted through an exit pupil 12 of the object lens 11 to the eye point EP, is formed on the surface of the reticle 21 at the opposite side of the focal plane 22 (surface at the object side). The Fresnel lens surface 23 has a function to guide the light of the real image, which is formed on the focal plane 21 by the object lens 11, to the eye point. By this, the real image of the objective lens 11, including the peripheral area, can be observed by the eye point EP. The Fresnel lens surface 23 is positioned so that the center 23a thereof is shifted in a direction forming a right angle with the optical axis O1 of the finder optical system 20 according to the position of the photometric device 30.

In the single lens reflex camera 1 having this configuration, when the field of view is observed, light from an object (not illustrated) passes through the objective lens 11, is reflected by the quick return mirror 13 in a direction to the reticle 21, and is transmitted through the Fresnel lens surface 23 of the reticle 21, to form the object image on the focal plane 22. In the finder optical system 20, the light from the object image formed on the focal plane 22 is transmitted through the liquid crystal display element 24, penta prism 25 and ocular 26, and is guided to the eye point EP, and the observer can observe the real image of the object (not illustrated) at the eye point EP. At the shutter release, the light which passes through the objective lens 11 from the object (not illustrated) forms an image on the image sensing element 14, since the quick return mirror 13 becomes mirror up status.

When the field of view is observed, a part of the light, which is transmitted through the reticle 21 of the finder optical system 20 and condensed at the eye point EP, is condensed to the photometric sensor 32 via the photometric lens 31 of the photometric device 30, and the photometric sensor 32 measures the light which is transmitted through the reticle 21. In this case, the Fresnel lens surface 23 is positioned so that the center 23a thereof is shifted to the side of the photometric device 30 in a direction to form a right angle with the optical axis O1 of the finder optical system 20.

According to the present embodiment, the center 23a of the Fresnel lens surface 23 is shifted to a direction crossing with the optical axis O1 of the finder optical system 20 according to the position of the photometric device 30, whereby the light which reaches from the reticle 21 to the photometric device 30 can be increased, therefore light of the focal plane 22 can be obtained uniformly at the photometric device 30, and light on the entire surface of the focal plane 22 (that is all the lights in the photographing range) can be obtained, so photometry can be performed over a wider range. A particularly high effect can be obtained by applying this aspect to a single lens reflex camera 1.

A Fresnel lens originally has a condensing function, but this condensing power is not very robust. This is because increasing the condensing power radically limits the range where the eyes of the observer can be positioned to look. If the condensing power is decreased too much, on the other hand, the brightness of the observed image drops, and the original function of the Fresnel lens becomes insufficient. If the amount of shifting the Fresnel lens surface 23 is within an appropriate range, as in the case of the present embodiment, rays to be guided to the photometric sensor 32 can be increased while maintaining the original function of the Fresnel lens, hence the problem the present invention is to solve can be improved.

Figure 3A:
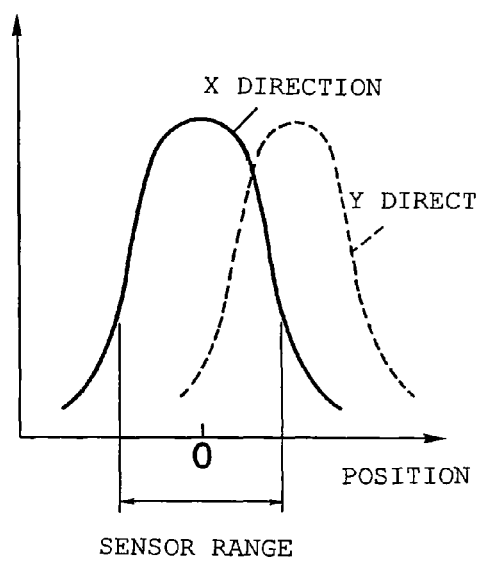
FIG. 3A is a graph depicting an illuminance distribution of a conventional photometric sensor.
Figure 3B:
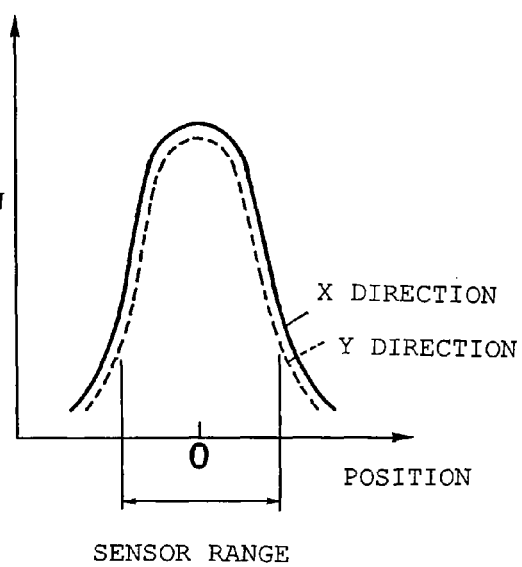
FIG. 3B is a graph depicting an illuminance distribution of a photometric sensor according to the present embodiment.

FIGS. 3A and 3B show graphs when the illuminance distributions of the photometric sensor 32 in the X and Y directions are simulated. The solid line in the graphs show illuminance in a direction perpendicular to the page face (X direction: see FIG. 2 and FIG. 4), and the broken line shows illuminance in a direction parallel with the page face (Y direction: see FIG. 2 and FIG. 4). The ordinate of the graphs indicates illuminance, and the abscissa thereof indicates a position on the photometric sensor 32, and 0 is the center position of the photometric sensor 32.

FIG. 3A is a simulation result with the prior art shown in FIG. 4, and as the graph of FIG. 3A shows, the illuminance distribution in the Y direction is not balanced with respect to the center of the sensor. When 0 is the center, the horizontal illumination range in the Y direction shows that the right side of the center is wider than (more than double) the left side. This problem is generated because the optical axis O2 of the photometric device 30 is inclined from the optical axis O1 of the finder optical system 20. FIG. 3B, on the other hand, is a simulation result with the present embodiment shown in FIG. 2, and compared with FIG. 3A, asymmetry in the Y direction in particular is improved. Since the center 23a of the Fresnel lens surface 23 by shifting to the photometric sensor 32 side, and as a result, the quantity of light included in the sensor range (range where the photometric sensor 32 can detect) increases, and illuminance in the sensor range is largely improved.

Increasing the shift amount of the center 23a of the Fresnel lens surface 23 more than the appropriate range, however, is advantageous for the photometric device 30, but drops the original function of the Fresnel lens, that is, to guide light of the real image formed on the focal plane 22 by the object lens 11 to the eye point EP, so a decrease in peripheral light and an eclipse may occur in the field of view of the finder at the eye point EP. Therefore it is preferable to control the shift amount of the center 23a of the Fresnel lens surface 23 from the optical axis O1 of the finer optical system 20 to be 10 to 20% of dimensions of the field of view range (image circle dimensions) in the finder optical system 20. Within this range, a drop in the original function of the Fresnel lens can be kept to within an allowable range. Here the image circle dimensions are equal to the length of the diagonal line of the image formation range in the reticle 21, and is also equal to the length of the diagonal line of the screen of the image sensing element 14.

It is preferable that when the shift amount of the center 23a of the Fresnel lens surface 23 from the optical axis O1 of the finder optical system 20 is X, and the focal length of the ocular 26 is fe, the following conditional Expression (1) is satisfied. Here X is a distance between the center 23a of the Fresnel lens surface 23 and the optical axis O1 of the finder optical system 20, and is a length of a perpendicular line from the center 23a to the optical axis O1.

$$0 < X/fe < 0.2 \tag{1}$$

This conditional Expression (1) is a conditional expression to optimize the refractive power of the ocular 26 and the shift amount of the Fresnel lens surface 23. The distance between the reticle 21 and the eye point EP (human eyes) is in proportion to the focal length of the ocular 26. In other words, the conditional Expression (1) indirectly defines the relationship of the shift amount of the Fresnel lens surface 23 and the distance between the reticle 21 and the eye point EP (human eyes). If the conditions are below the lower limit of the conditional Expression (1), then the shift amount of the Fresnel lens surface 23 becomes too small to implement the effect of the present invention. If the conditions exceed the upper limit of the conditional Expression (1), on the other hand, the shift amount of the Fresnel lens surface 23 becomes so high that light to be guided to the eye point EP becomes insufficient. In order to implement the effect of the present invention with certainty, it is preferable to set thelower limit of the conditional Expression (1) to be 0.005.

For example, when the distance between the optical axis O1 of the finder optical system 20 and the photometric sensor 32 is Y (see FIG. 2 for the direction of Y) in the present embodiment, the shift amount X=3 mm is set if Y=9 mm and the focal length fe=56.4 mm. In this case X/fe=0.053, which satisfies the conditional Expression (1). Here Y is a distance from the optical axis O1 of the finder optical system 20 along the perpendicular direction, and is a length of the perpendicular line from the bottom end of the photometric device 30 to the optical axis O1.

As mentioned above, it is preferable that the center 23a of the Fresnel lens surface 23 is shifted in a direction forming a right angle or substantially a right angle, with the optical axis O1 of the finder optical system 20. By this, the influence of shifting the Fresnel lens surface 23 on the eye point EP can be decreased. Also when the finder optical system 20 is installed inside a single lens reflex camera 1, interference with other components caused by an inclination of the reticle 21 need not be considered.

As mentioned above, it is also preferable that the center 23a of the Fresnel lens surface 23 is shifted to the side where the photometric device 30 is disposed. By this, more light can be guided to the photometric device 30.

It is preferable that the center 23a of the Fresnel lens surface 23 is shifted to a position where the incident light to the photometric device 30 is substantially uniform on the photometric device 30 (on the photometric surface 32a of the photometric sensor 32). By this, more accurate photometry can be performed. For the shift amount of the center 23a, an appropriate range is determined according to the distance between the photometric device 30 and the optical axis O1 of the finder optical system 20. Therefore an appropriate range of the shift amount of the center 23a is determined based on at least one of the position of the photometric device 30 and the distance from the reticle 21 to the eye point EP.

Hence even if a plurality of focal point detection area marks 35a to 35k are set (by the liquid crystal display element 24) in the observation area of the object image by the finder optical system 20, as shown in FIG. 4, more light is guided to areas corresponding to the focal point detection area marks 35a to 35k, so the photometric sensor 32 can output more accurate image signals. In particular, sufficiently accurate image signals can be output even for an area in the bottom ⅓ of the photometric surface 32a of the photometric sensor 32, which correspond to the bottom three focal point detection area marks 35i to 35k in FIG. 4.

In prior art, the distance between one end of the reticle 21 and the top end of the photometric sensor 32 is shorter than the distance between the other end of the reticle 21 and the bottom end of the photometric sensor 32, and the quantity of light tends to be insufficient in the bottom area of the photometric sensor 32. In the present embodiment, however, sufficiently accurate image signals can be output even for the bottom ⅓ area of the photometric surface 32a of the photometric sensor 32, so a big difference in the output values, generated between the image signals which are output from the areas corresponding to the bottom three focal point detection area marks 35i to 35k and the output signals which are output from areas corresponding to the other focal point detection area marks 35a to 35h shown in FIG. 4, can be eliminated. The vertical direction of the photometric sensor 32 corresponds to the vertical direction (Y direction) in FIG. 1 and FIG. 2.

In the above embodiment, the present invention can be applied not only to a single lens reflex camera 1, but also to other optical apparatuses having a finder optical system. The above mentioned embodiment is merely one example, and is not limited to the above mentioned configuration and forms, but can be modified and changed within the scope of the present invention.

In the above embodiment, the Fresnel lens disposed in the finder optical system 20 was described, but the present invention is not limited to this, and can be applied also to a Fresnel lens installed in the illumination device, such as a stroboscope, and specifically, the center of this Fresnel lens is positioned so as to be shifted to a direction crossing the optical axis of the optical system constituting the illumination device.

In the above embodiment, the "side where the photometric device 30 is disposed" to shift the center 23a of the Fresnel lens surface 23 is the "side where the photometric device 30 is disposed" in the optical cross sectional view (FIG. 2) in which the optical path of the finder optical system 20 is linearly depicted, and not the "side where the photometric device 30" in a status where the photometric device 30 is installed in a single lens reflex camera 1 (right side in FIG. 1).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical apparatus, comprising:
   a finder optical system that observes an image formed on a reticle by an imaging lens; and
   a photometric device that measures light transmitted through the reticle via at least a part of the finder optical system, at a position shifted from an optical axis of the finder optical system, wherein
   the finder optical system comprises a Fresnel lens which transmits light from the imaging lens, and
   the Fresnel lens is positioned so that the center of the Fresnel lens is shifted in a direction to cross the optical axis of the finder optical system according to a position of the photometric device.

2. The optical apparatus according to claim 1, wherein the center of the Fresnel lens is shifted in a direction to form a right angle or substantially a right angle with the optical axis of the finder optical system.

3. The optical apparatus according to claim 1, wherein the center of the Fresnel lens is shifted to a side where the photometric device is disposed.

4. The optical apparatus according to claim 1, wherein the center of the Fresnel lens is shifted to a position where incident light to the photometric device is substantially uniform on the photometric device.

5. The optical apparatus according to claim 1, wherein the photometric device has a photometric surface that performs a photometry, and the center of the Fresnel lens is shifted to a position where incident light to the photometric surface is substantially uniform on the photometric surface.

6. The optical apparatus according to claim 1, wherein a shift amount of the center of the Fresnel lens from the optical axis of the finder optical system is 10 to 20% of dimensions of a field of view range of the finder optical system.

7. The optical apparatus according to claim 1, wherein the finder optical system comprises an ocular, and where a shift amount of the center of the Fresnel lens from the optical axis of the finder optical system is X and a focal length of the ocular is fe, a condition of the expression $$0<X/fe<0.2$$

is satisfied.

8. The optical apparatus according to claim 1, wherein the optical apparatus is a camera.

9. A manufacturing method of an optical apparatus, comprising the steps of:

providing a finder optical system that observes an image formed on a reticle by an imaging lens, and a photometric device that measures light transmitted through the reticle via at least a part of the finder optical system, at a position shifted from an optical axis of the finder optical system;

providing a Fresnel lens which transmits light from the imaging lens in the finder optical system; and positioning the Fresnel lens so that the center of the Fresnel lens is shifted in a direction to cross the optical axis of the finder optical system according to a position of the photometric device.

10. The manufacturing method of the optical apparatus according to claim 9, wherein the center of the Fresnel lens is shifted in a direction to form a right angle or substantially a right angle with the optical axis of the finder optical system.

11. The manufacturing method of the optical apparatus according to claim 9, wherein the center of the Fresnel lens is shifted to a side where the photometric device is disposed.

12. The manufacturing method of the optical apparatus according to claim 9, wherein the center of the Fresnel lens is shifted to a position where incident light to the photometric device is substantially uniform on the photometric device.

13. The manufacturing method of the optical apparatus according to claim 9, wherein the photometric device has a photometric surface that performs the photometry, and the center of the Fresnel lens is shifted to a position where incident light to the photometric surface is substantially uniform on the photometric surface.

14. The manufacturing method of the optical apparatus according to claim 9, wherein a shift amount of the center of the Fresnel lens from the optical axis of the finder optical system is 10 to 20% of dimensions of a field of view range of the finder optical system.

15. The manufacturing method of the optical apparatus according to claim 9, wherein the finder optical system comprises an ocular, and where a shift amount of the center of the Fresnel lens from the optical axis of the finder optical system is X and a focal length of the ocular is fe, a condition of the expression $$0<X/fe<0.2$$

is satisfied.

16. The manufacturing method of the optical apparatus according to claim 9, wherein the optical apparatus is a camera.

* * * * *